United States Patent
Kuehn et al.

(10) Patent No.: US 12,192,193 B2
(45) Date of Patent: Jan. 7, 2025

(54) Li-Fi-BASED LOCATION AUTHENTICATION

(71) Applicant: Capital One Services, LLC, McLean, VA (US)

(72) Inventors: Joshua Kuehn, Lowell, AR (US); Dean Foster, Frederick, MD (US); Nicholas Capurso, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 251 days.

(21) Appl. No.: 17/980,885

(22) Filed: Nov. 4, 2022

(65) Prior Publication Data
US 2024/0154951 A1 May 9, 2024

(51) Int. Cl.
*H04L 9/40* (2022.01)
*H04B 10/116* (2013.01)

(52) U.S. Cl.
CPC .......... *H04L 63/083* (2013.01); *H04B 10/116* (2013.01)

(58) Field of Classification Search
CPC . H04L 63/0853; H04L 63/10; H04L 63/0428; H04L 63/0861; H04L 63/102; H04L 63/08; H04L 63/083; G06F 21/31; H04B 10/116; H04W 12/06
See application file for complete search history.

(56) References Cited

U.S. PATENT DOCUMENTS

| | | | | |
|---|---|---|---|---|
| 9,876,770 B1 * | 1/2018 | Ekambaram | ........... | H04B 10/85 |
| 10,178,552 B2 * | 1/2019 | Yeom | ................... | H04W 12/068 |
| 10,187,146 B2 * | 1/2019 | Tilaye | ................... | H04B 10/116 |
| 10,330,957 B2 * | 6/2019 | Boss | ...................... | H04B 10/116 |
| 10,834,589 B2 * | 11/2020 | Bharti | ..................... | G02C 7/04 |
| 11,012,869 B1 * | 5/2021 | Kwatra | ............... | H04B 10/1149 |
| 11,805,411 B2 * | 10/2023 | Wang | .................... | H04W 12/06 |
| 2016/0349347 A1 * | 12/2016 | Hillan | ................... | H04L 9/3271 |
| 2017/0173262 A1 * | 6/2017 | Veltz | ...................... | G16H 20/17 |
| 2017/0251365 A1 * | 8/2017 | Burchardt | ............. | H04L 63/107 |
| 2018/0083701 A1 * | 3/2018 | Tilaye | ................... | H04B 10/116 |
| 2018/0159621 A1 * | 6/2018 | Beas Bujanos | ....... | H04B 10/116 |
| 2018/0210235 A1 * | 7/2018 | Boss | ...................... | G02C 11/10 |
| 2018/0262908 A1 * | 9/2018 | Yeom | ...................... | H04L 63/18 |
| 2019/0052638 A1 * | 2/2019 | Agarwal | ............... | H04W 12/08 |
| 2019/0132732 A1 * | 5/2019 | Bharti | ..................... | G02C 7/04 |
| 2020/0284883 A1 * | 9/2020 | Ferreira | ............... | H04N 25/773 |
| 2020/0382958 A1 * | 12/2020 | Wang | .................... | H04W 12/06 |
| 2020/0399929 A1 * | 12/2020 | Hardter | .................... | G07C 9/27 |
| 2021/0266741 A1 * | 8/2021 | Kwatra | .................... | H04W 12/06 |
| 2021/0345101 A1 * | 11/2021 | Hardter | ................. | H04L 9/3263 |

(Continued)

*Primary Examiner* — Ninos Donabed
(74) *Attorney, Agent, or Firm* — Banner & Witcoff, Ltd.

(57) ABSTRACT

Methods, systems, and apparatuses are described herein for improving the security of computer authentication using light communications data provided by, e.g., environmental Li-Fi light sources. A mobile device may receive light communications data from a light source, such as a Li-Fi-enabled light bulb in a physical environment of the mobile device. That light communications data may indicate a variation in a modulation of light intensity of the light source over a time period. That variation might be used to provide a time- and/or location-specific key. The mobile device may determine the key by processing the light communications data and transmit a request for content that comprises the key. Access to content may be provided to the mobile device based on the key.

18 Claims, 5 Drawing Sheets

(56) References Cited

U.S. PATENT DOCUMENTS

| | | | |
|---|---|---|---|
| 2021/0360640 A1* | 11/2021 | Mondal | H04W 24/02 |
| 2022/0162000 A1* | 5/2022 | Korge-Hårajuvet | B65G 1/0478 |
| 2022/0227492 A1* | 7/2022 | Puertolas | B60N 2/879 |
| 2022/0231399 A1* | 7/2022 | Brown | H01Q 1/1221 |
| 2023/0111629 A1* | 4/2023 | Van Wageningen | H04W 36/087 |
| | | | 398/118 |
| 2023/0179300 A1* | 6/2023 | Germe | H04B 10/116 |
| | | | 398/130 |
| 2024/0113780 A1* | 4/2024 | Germe | H04B 10/1143 |

\* cited by examiner

Li-Fi-BASED LOCATION AUTHENTICATION

FIELD OF USE

Aspects of the disclosure relate generally to computer authentication. More specifically, aspects of the disclosure may provide for improvements to computer authentication using light-transmitted keys, such as might be implemented through Li-Fi light bulbs.

BACKGROUND

As part of computer authentication, a device might be authenticated based on its geographic location. For example, a device might be authenticated because the device provides valid authentication credentials and because the device is in a location (e.g., a home, an office) known to be associated with the device. A server might authenticate a device by comparing a location of the device to one or more authorized locations. For example, a device might only be authenticated if it is in a certain country, in a certain office, or the like.

It is increasingly easy to spoof Global Positioning System (GPS) coordinates, such that a device might report false location information as part of a malicious attempt to gain access to content. For example, a malicious hacker in Russia might spoof American GPS coordinates as part of a hacking attack. As such, a device might be improperly authenticated based on entirely false GPS coordinates.

Aspects described herein may address these and other problems, and generally improve the safety of computer authentication systems by using light communications data, such as that which might be transmitted by Li-Fi-enabled devices, to aid in the determination of a location of a device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein leverage the data communications capabilities of light sources, such as Li-Fi-enabled light bulbs, to provide location information that can be used as part of authenticating a device. Various light sources, such as light bulbs, may be configured to transmit data via Li-Fi. For instance, a light bulb may be configured to modulate its light intensity in a way that is largely imperceptible to the human eye, but in a manner that can transmit data to devices within sight of the light (and not, e.g., those too far away, behind walls, or the like). Those light sources may be configured to transmit different keys (e.g., unique strings) on a periodic basis. A device may receive, via such light sources, light communications data. The device may process that light communications data to determine a key that corresponds to both the light source and the time period during which the light communications data was received. The device may then, as part of transmitting a request for content to a server, send the server the key. For example, the device might attempt to access content and provide, to a server, user authentication credentials and the key. The server might then provide access to the content based on the key (and, e.g., other authentication credentials provided by the device).

More particularly, some aspects described herein may provide for a mobile device that may receive, via a light-sensitive device and from a light source (e.g., a light bulb) in a physical environment of the mobile device, light communications data that indicates a variation in a modulation of light intensity of the light source over a time period. For example, the modulated light might comprise a modulation of ultraviolet light emitted by the light source over the time period. As another example, the light communications data may indicate a variation in color of the light source over the time period. That light source may be configured to transmit different keys on a periodic basis. The light source may be configured to transmit data via light in accordance with a wireless transmission protocol. For example, the light-sensitive device may comprise a Li-Fi receiver communicatively coupled to the mobile device, and the light source may comprise a Li-Fi transmitter. As another example, the light-sensitive device may comprise one or more cameras, and receipt of the light communications data may comprise causing the one or more cameras to record video at a predetermined framerate and determining the light communications data by processing the video. That framerate might be determined based on GPS coordinates determined using, for example, a GPS module of the mobile device or based on information received from a remote server. The mobile device may determine a key corresponding to the light source and the time period by processing the light communications data. For example, as part of processing the light communications data, the mobile device may process the modulation of the light intensity of the light source over the time period to determine the key. The mobile device may then transmit, to a remote server, a request for content, wherein the request for content comprises the key. For example, the mobile device may receive, via a user interface, user authentication credentials, then send the request such that the request comprises the user authentication credentials and the key. As another example, the mobile device may transmit, via a wireless network protocol different from Li-Fi, the request for the content. The mobile device may then receive, from the remote server and based a determination that the key is associated with the physical environment, access to the content.

Corresponding method, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving computer authentication security by using time- and/or location-specific keys, transmitted through light sources such as Li-Fi transmitters, that are significantly harder to spoof than GPS coordinates. In this manner, as part of an authentication process, the location of a computing device might be more securely determined, which in turn may make the overall process of authenticating (or, as desired, not authenticating) a device more secure. This process also makes it significantly harder for malicious parties to acquire keys: because the light sources described herein might only transmit data to devices within view of the light sources (e.g., to customers inside a bank branch and within view of a light bulb), malicious parties cannot acquire the key unless they are in certain locations (e.g., such that malicious parties cannot simply park in a nearby parking lot and try to acquire the key without being inside the bank branch).

As an example of how the present disclosure may operate, a bank branch might install a Li-Fi-enabled light source (e.g., a light emitting diode, a light bulb) above their teller windows. This Li-Fi-enabled light bulb might be configured to transmit, via light (e.g., by changing the color of the light, by changing the intensity of light such as ultraviolet, infrared, and/or ultraviolet light, or the like), a key that changes based on time (e.g., a key that changes every minute). Customers might enter the bank branch and try to conduct transactions using their mobile devices at the teller window. As part of this process, those customers' mobile devices might receive light communications data from the Li-Fi-enabled light bulb because, e.g., the mobile devices might be in view of the Li-Fi-enabled light bulb. For instance, a light-sensitive device on the mobile devices (e.g., one or more cameras, a Li-Fi receiver, or the like) might begin to receive the light communications data. The mobile device might process that light communications data to determine a key which corresponds to the specific light bulb, a specific time period, and/or a specific physical location (e.g., the bank branch). The mobile device might then, as part of requesting content (e.g., access to a bank account interface associated with the bank branch), provide the key to a server. The server might determine, based on the key, whether the mobile device is in the bank branch (e.g., if the key corresponds to the specific light bulb, the specific time period, and/or the specific physical location). Based on that determination (and, e.g., other determinations, such as the evaluation of user credentials, such as whether a user provided appropriate usernames/passwords/two-factor authentication codes), the server might provide the mobile device access to the content. For example, the determination as to whether the mobile device is in the bank branch may be used along with other user authentication credentials (such as a username, password, and text message PIN entry) to determine whether the mobile device should be permitted to instantiate a transaction whereby funds are withdrawn.

Aspects described herein improve the functioning of computers by improving computing security, particularly in view of limitations of conventional computing devices with respect to geographic location. As indicated above, many conventional computing devices can freely spoof their geographic location. For example, it is rather easy to spoof GPS coordinates on a mobile device or using a desktop web browser. As such, conventional computing devices increasingly cannot be trusted to accurately indicate their geographic location, especially when such a location is used for computer authentication. The present disclosure uses a unique form of data communications (e.g., Li-Fi or similar light communications processes) to transmit keys in a manner which ensures that the keys are significantly more difficult to spoof and in a manner which roughly guarantees that the recipient is in a particular geographic region. In some ways, this process acts as a form of two-factor authentication that is automatic and does not require the manual intervention of users, which can itself make the overall authentication process more secure but easier for users. In turn, conditioning computer authentication on such keys allows for better security, as it allows systems to more reliably determine whether devices are in a particular geographic location.

The aspects described herein are fundamentally directed to improvements in computer hardware and computer security, even though some portions of the disclosure provided herein describe bank branches and similar concepts. The concept of a bank branch is referred to herein in part because of the importance of security in such a location and because such locations would potentially be more willing to install devices (e.g., Li-Fi light bulbs that transmit rolling keys) that facilitate such security. That said, aspects described herein could be implemented in a wide variety of circumstances. For example, aspects described herein could be implemented in a user's home office, at a grocery store, in a school, or the like.

Before discussing these concepts in greater detail, however, several examples of a computing device that may be used in implementing and/or otherwise providing various aspects of the disclosure will first be discussed with respect to FIG. 1.

Figure 1:
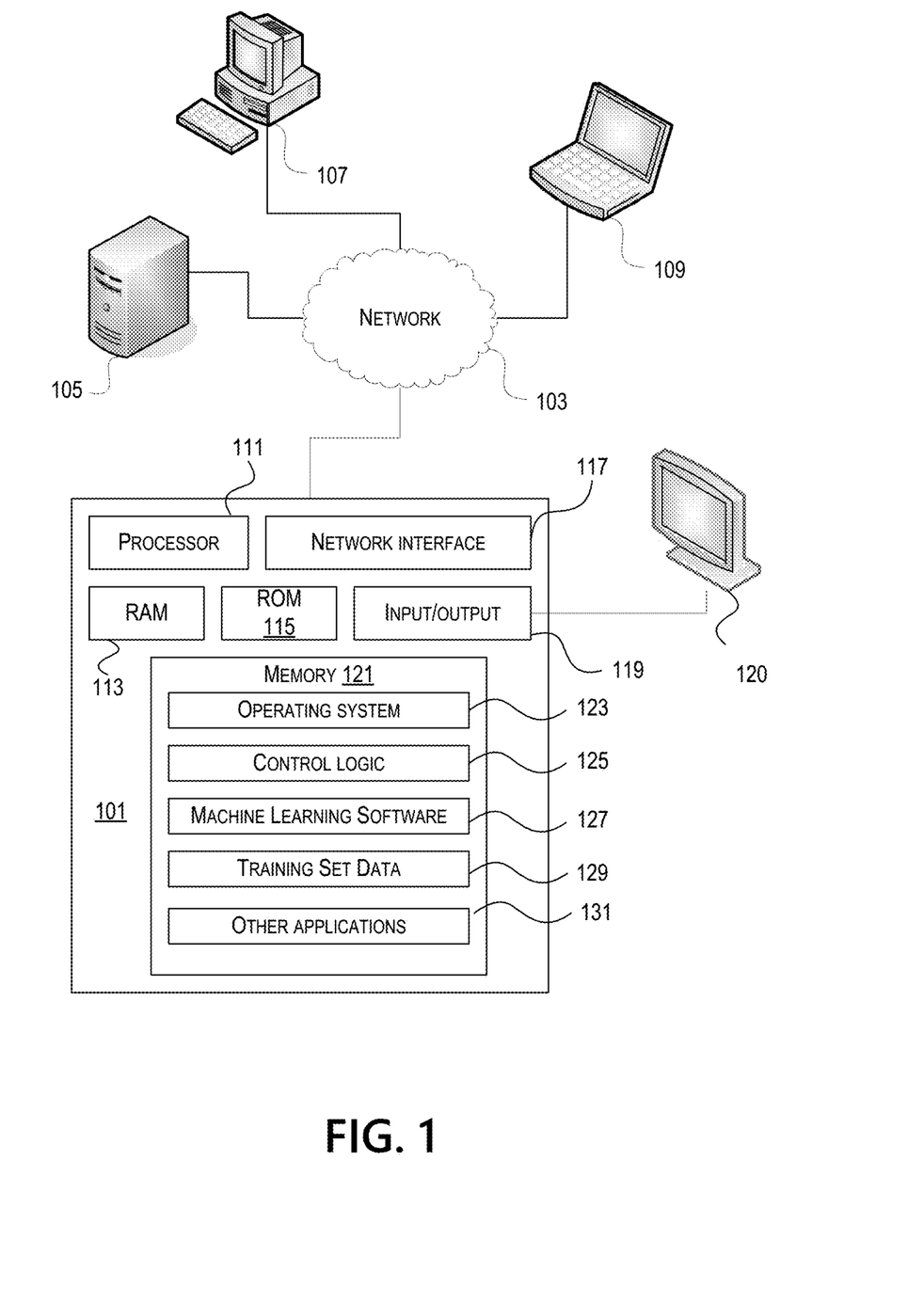
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
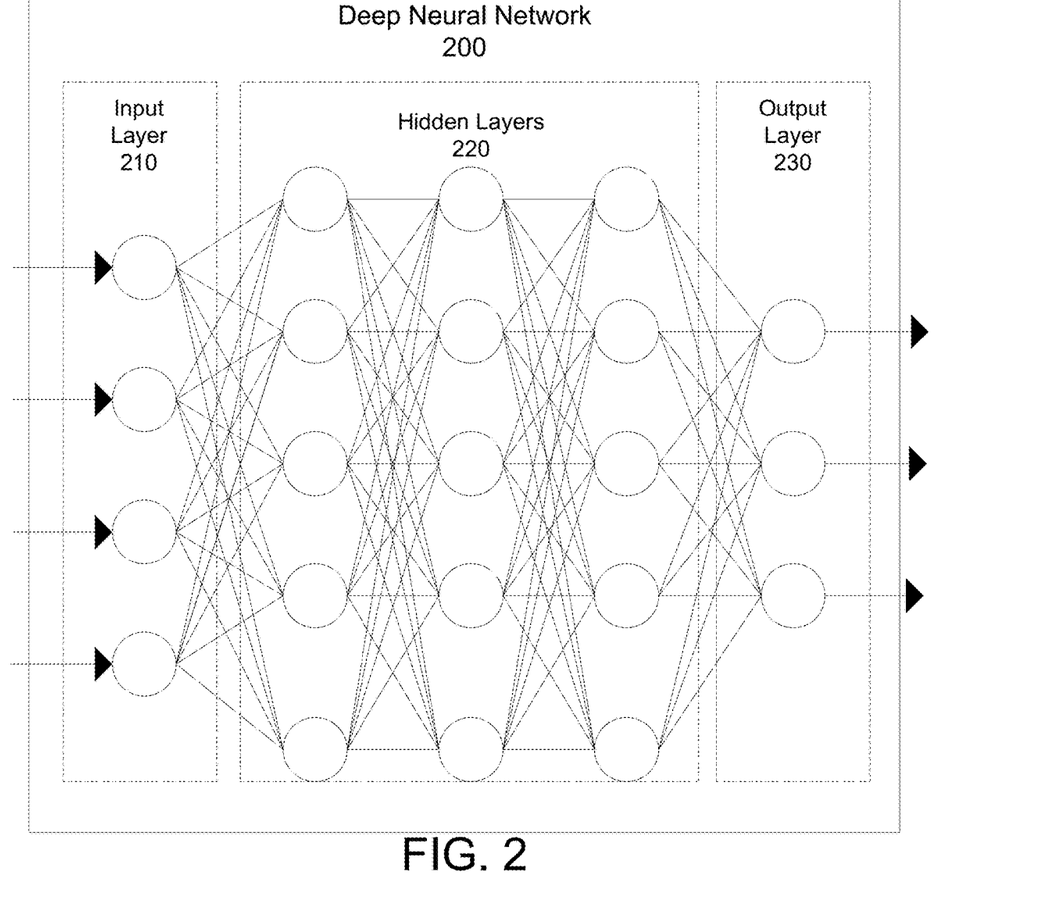
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
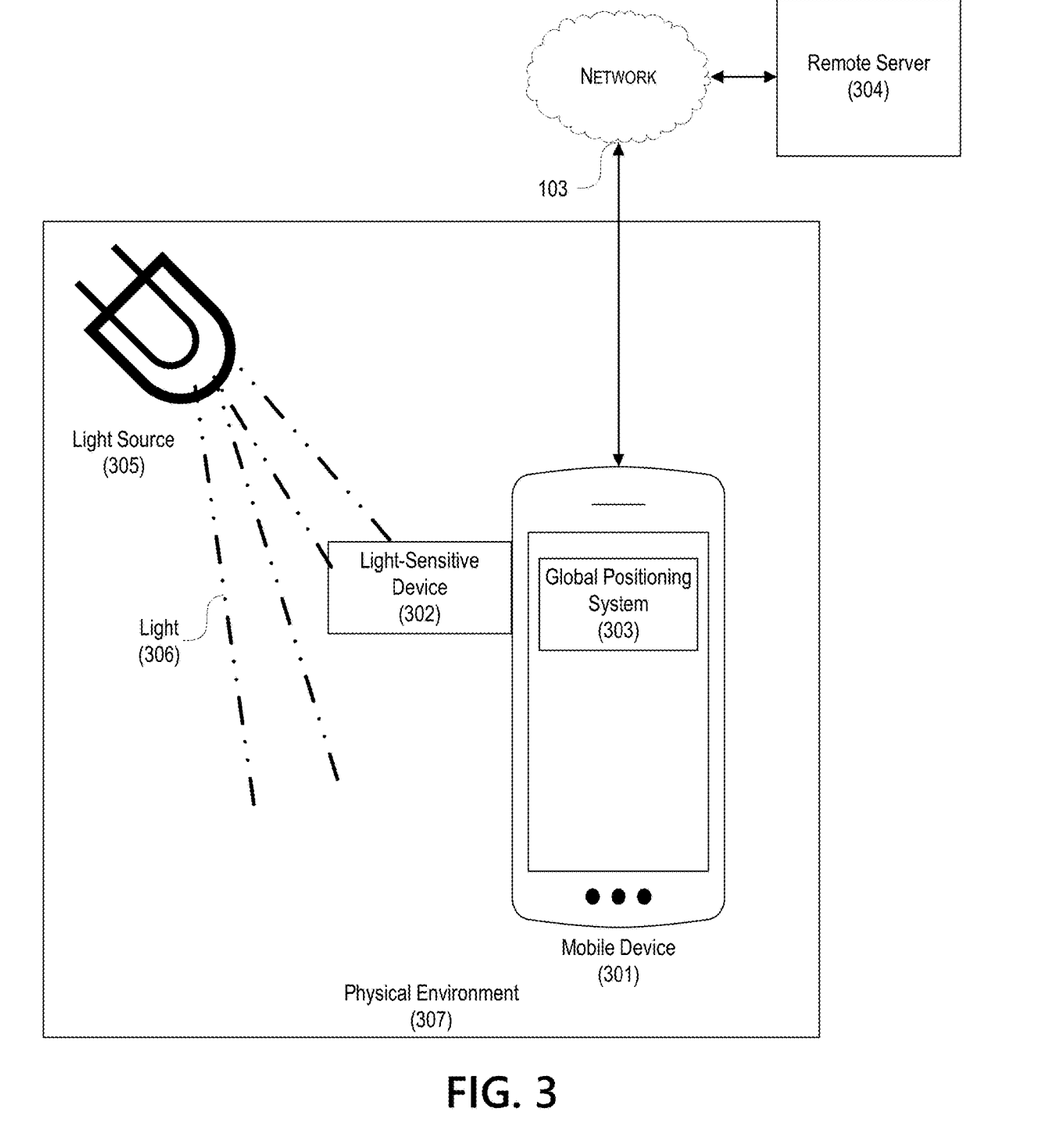
FIG. 3 depicts a system comprising a mobile device with a light-sensitive device, a light source, and a remote server.

FIG. 3 depicts a physical environment 307 comprising a mobile device 301 with a global positioning system 303, a light-sensitive device 302 communicatively coupled to the mobile device 301, and a light source 305 emitting light 306. FIG. 3 also depicts a remote server 304, that need not be in the physical environment 307, that is communicatively coupled to the mobile device 301 via the network 103. All of portions of the mobile device 301, light-sensitive device 302, light source 305, and/or remote server 304 may be a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps.

The mobile device 301 may be a computing device in the physical environment 307, such as a laptop, desktop, smartphone, gaming console, smart watch, or the like. As depicted in FIG. 3, the mobile device 301 may comprise the global positioning system 303, which may enable the mobile device 301 to determine GPS coordinates. For example, the mobile device 301 may use the global positioning system 303 to determine its GPS coordinates at a particular point in time. The mobile device 301 may additionally and/or alternatively communicate with one or more remote computing devices to determine its GPS coordinates. For example, the mobile device 301 may be provided GPS coordinates from a remote server in circumstances where the mobile device 301 is not itself equipped with the global positioning system 303. The mobile device 301 may additionally and/or alternatively be communicatively coupled to the light-sensitive device 302, and may use the light-sensitive device 302 to receive light communications data. For example, the light-sensitive device 302 may comprise a Li-Fi receiver that is configured to receive the light 306 and, if the light 306 complies with the Li-Fi protocol (e.g., a light intensity of the light is modulated over a time period to communicate data), translate the light 306 into data. As another example, the light-sensitive device 302 may comprise one or more cameras which, at the appropriate framerate, may detect the modulation of the light 306 and translate that modulation into data. As such, while in some cases the mobile device 301 may comprise the light-sensitive device 302 (e.g., such that the light-sensitive device 302 is part of a housing of the mobile device 301), in some circumstances the light-sensitive device 302 may be separate from, but communicatively coupled to, the mobile device. For example, the light-sensitive device 302 might comprise a Li-Fi receiver in the form of a Universal Serial Bus (USB) dongle that, when plugged into a USB port of the mobile device 301, provides data based on capture of the light 306 by the light-sensitive device 302.

As indicated above, the light-sensitive device 302 may be implemented with respect to the mobile device 301 in a number of ways. For example, the light-sensitive device 302 may be part of a housing of the mobile device 301, such that the light-sensitive device 302 might be integrated into the mobile device 301 much like how conventional smartphones are integrated with one or more microphones and/or one or more cameras. As another example, the light-sensitive device 302 may be an attachment (e.g., a dongle, such as a USB dongle) which may be plugged into the mobile device 301 to perform its functionalities. In some cases, such an attachment might be part of a case for the mobile device 301, such as a case for a smartphone. As another example, the light-sensitive device 302 might be communicatively coupled to the mobile device 301 via one or more networks. For example, the light-sensitive device 302 might be connected to the mobile device 301 via the Internet.

The light source 305, which may be a light bulb or similar light-emitting device, may be configured to transmit data through the modulation of one or more aspects of the light 306. Broadly, the light source 305 may be configured to transmit data via light in accordance with a wireless transmission protocol. For example, in the same way in which Wi-Fi transmits data via radio waves, the light source might transmit data via light waves. The particular manner in which light waves are modified to transmit data may vary. For example, the light source 305 may be configured to modulate visible light, ultraviolet light, and/or infrared light emitted by the light source 305 over a period of time so as to transmit data. For instance, the light source 305 may decrease and/or increase the brightness of emitted light to represent different binary values. As another example, the light source 305 may be configured to modulate a color of light emitted by the light source 305 over a period of time so as to transmit data. For instance, the light source 305 may switch between two different colors to represent different binary values. The particular manner of data transmission via light might vary based on operating conditions. For example, in some circumstances (e.g., where the light source 305 is plugged into a conventional light source, such as a lamp), it may be desirable to transmit data through minor, largely human-imperceptible forms of visible light modulation, such that the light is still usable to illuminate the physical environment 307. As another example, in some circumstances (e.g., where the light source 305 is intended to be hidden), it may be desirable to transmit data through ultraviolet and/or infrared light.

The light source 305 may be used to transmit light communications data in a variety of ways. The light source 305 may comprise a light emitter or similar element which can transmit different forms of light. For instance, the light source 305 may be configured to emit, via one or more light emitting diodes, different colors. In such a circumstance, the light source 305 may be capable of transmitting data by switching between two colors, such that one color represents "0" and another color represents "1." As another example, the light source 305 may be configured to emit, via one or more light emitting diodes, light (e.g., visible, infrared, and/or ultraviolet light) at different intensities. In such a circumstance, the light source 305 may be capable of transmitting data by varying the intensity of light such that light at one intensity corresponds to a "0" and light at a different intensity corresponds to a "1." Significantly more complex configurations might be implemented, such as by permitting different colors and/or intensities of light to represent a wider spectrum of values (e.g., a full ASCII set of characters). The frequency with which the light is modulated (e.g., the colors are changed, the intensity of the light is changed) might be based on a variety of factors, such as the speed of one or more light emitting diodes, the desired frequency of data transmission, and the like. Moreover, as will be described further below, the frequency with which the light is modulated may be based, in whole or in part, on the framerate of a camera, photodiode, and/or other sensor intended to capture the light data.

The light source 305 might be significantly different than other forms of light communication (e.g., transmission via fiber optic cable) in a number of ways. The light source 305 might be configured to not merely transmit data, but also to provide light to a physical environment, such as the physical environment 307. For instance, the modulation of the light source 305 as part of transmitting data might be so fast and/or minor that it might not be perceptible to human eyes, but it might nonetheless be usable to transmit data. In this circumstance, an ordinary light bulb that provides illumination to a physical environment might be simultaneously used to transmit data. Moreover, the light source 305 need not be communicatively coupled to any form of wire, fiber optic cable, or similar element, other than being connected to some source of power (e.g., a power line, a battery, or the like). For instance, transmissions from the light source 305 to the light-sensitive device 302 may be performed even though the two are not connected via a cable, fiber optic wire, or the like. Rather, such transmissions might be made merely through the atmosphere. This may advantageously permit the light source 305 to transmit data to the light-sensitive device 302 even in circumstances where the two devices are in no way connected. Stated differently, the process with which data is transmitted may be via free space optics, rather than through optical fiber cable or the like.

The light source 305 may be configured to transmit keys in a variety of ways. In some circumstances, the light source 305 may be communicatively coupled to appropriate circuitry (e.g., a processor, memory) that permits the light source 305 to execute code which generates different keys over time. This might allow the light source 305 to be disconnected from networks, such that the light source 305 is effectively air gapped from potential hacking attempts. In some circumstances, the light source 305 may be communicatively coupled over one or more networks to computing devices (e.g., the remote server 304). In this circumstance, the light source 305 may transmit keys received from the remote server 304. This approach may be advantageous where the key generation algorithm is particularly complex and/or particularly secure. Indeed, this approach may advantageously allow the remote server 304 to more easily compare keys received from mobile devices: it could generate a key, store the key, transmit the key to the light source 305, and then compare received key(s) to the stored key.

One advantage of the light source 305 is that it need not be specifically directed towards any particular region of the physical environment 307. Because the light source 305 may be a light bulb or similar light-emitting element, the light source 305 may emit light (and, as desired, transmit data) to wherever the light from the light source 305 shines. As such, various mirrors and/or other reflective elements may be implemented to bounce the light (and, as applicable, the data) from the light source 305 around the physical environment 307. Moreover, the light-sensitive device 302 need not be specifically pointed at the light source 305 for it to receive data. With that said, walls and other physical elements might block light from the light source 305 from being received outside of the physical environment 307. This may itself act as a form of security: whereas devices in the physical environment 307 might be able to receive light, devices outside of the physical environment 307 might not be capable of receiving the light. This might be contrasted to Wi-Fi and similar radio communications technologies, which might (desirably or undesirably) be capable of transmitting data through solid objects such as walls and floors.

The light source 305 may be configured to mask and/or otherwise obscure its power draw so as to obscure the data being transmitted by the light source 305. In some circumstances, the amount of power consumed by the light source 305 over time might be usable to determine the data transmitted by the light source 305. For instance, if the light source 305 turns on to transmit a "1" and off to transmit a "0," then a malicious party could monitor the power draw of an electrical line running to the light source 305 to attempt to determine the data being transmitted by the light source 305. To mask this activity, the light source 305 may be equipped with resistors or other forms of power sink such that the light source 305 draws an unchanging amount of power regardless of how it is transmitting data. Additionally and/or alternatively, the light source 305 might transmit data by changing colors of light emitting diodes, which might effectively cause the light source 305 to draw approximately the same amount of power regardless of data transmitted by the light source 305. Additionally and/or alternatively, the light source 305 may be configured to modulate light intensity in such a minimal fashion that changes to the overall power draw of the light source 305 are largely undetectable.

The remote server 304 may be configured to authenticate the mobile device 301 upon receipt of appropriate credentials. For example, the remote server 304 may be configured to authenticate a user of the mobile device 301 and provide the user access to content based upon receipt, from the mobile device, of user authentication credentials such as a username and/or a password. The remote server 304 may be configured to perform such an authentication based on a geographic location of the user. For example, the remote server 304 may be configured to authenticate a user based, in whole or in part, on whether the mobile device 301 is in one of a plurality of predetermined locations. As another example, remote server 304 may be configured to authenticate a user based on whether the user is in a geographic area associated with malicious activity. As part of this process, the remote server 304 may be configured to authenticate a user of the mobile device 301 based on receipt, via the network 103, of a key, such as a cryptographic key. Such a key may be received from the light source 305 and based on receipt, via the light-sensitive device 302, of the light 306. In this manner, authentication by the remote server 304 may be conditioned upon the mobile device 301 providing, to the remote server 304 and as part of a request for content, a key that is transmitted via the light source 305 at a particular point in time. In this manner, the remote server 304 may be able to verify that the mobile device 301 was, at the particular point in time, within view of the light source 305, and thus might infer a geographic location of the mobile device 301. To properly authenticate the mobile device 301, the remote server 304 may store data that allows it to confirm the authenticity of a key transmitted by the light source 305. For example, the remote server 304 and the light source 305 may comprise a secret value (e.g., password) that, when processed by an algorithm that takes time into account, produces a time-specific key. In this manner, when the remote server 304 receives a key from the mobile device 301 (e.g., as part of a request for content), the remote server 304 can use the secret value and algorithm to confirm the validity of the key.

In some cases, authentication of the mobile device might be conditioned on the key corresponding to GPS coordinates. As part of requesting content, the mobile device might provide a key received via a light source (such as the light source 305) and GPS coordinates. Those GPS coordinates may have been captured via the global positioning system 303. Additionally and/or alternatively, those GPS coordinates may have been determined based on information provided by one or more external computing devices. The remote server 304 might, in turn, condition authentication on the GPS coordinates received roughly corresponding to the light source 305. For example, if the GPS coordinates provided correspond to a location in Alaska but the light source 305 is located in North Carolina, authentication might be denied, and the mobile device might be denied access to content. In contrast, if the GPS coordinates provided correspond to a town in Virginia and the light source 305 is located in the same town in Virginia, authentication might be granted, and the mobile device might be provided access to content.

The particular process with which the key is generated by the light source 305 and validated by the remote server 304 may vary. Broadly, many two-factor authentication systems might be implemented using the system depicted in FIG. 3. For example, the same authentication code system used in some two-factor authentication systems might be implemented using the light source 305 depicted in FIG. 3.

Figure 4:
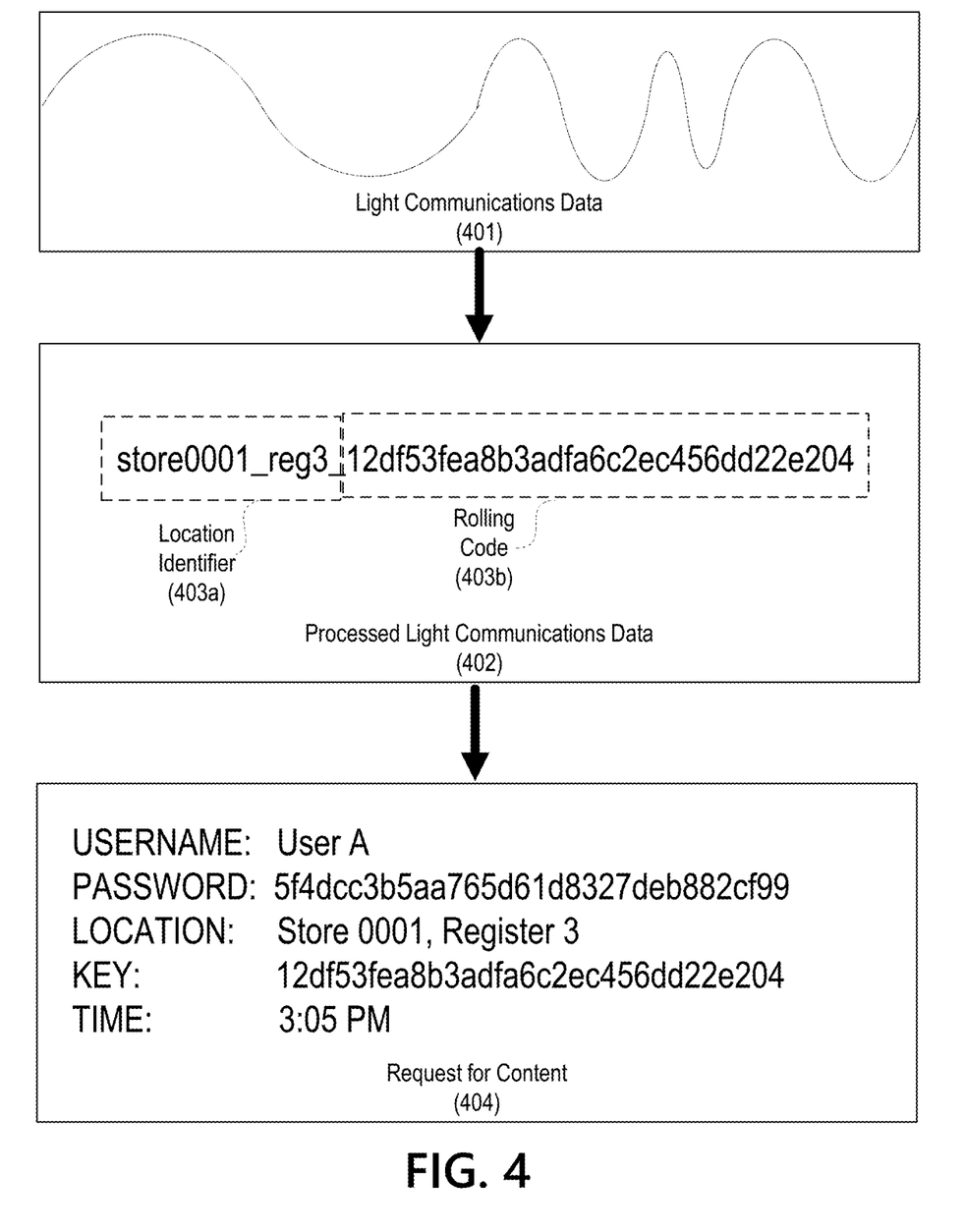
FIG. 4 depicts how light communications data may be processed to determine a key and the key may be used as part of a request for content.

FIG. 4 depicts how light communications data 401, such as might be transmitted via the light 306, might be processed into processed light communications data 402 and included in a request for content 404 sent to the remote server 304. As shown in FIG. 4, the light communications data 401 may indicate some variation on a modulation of light intensity of a light source over a time period. For example, the intensity and/or color of visible, ultraviolet, and/or infrared light might vary over time. This modulation might be processed by a computing device (such as the mobile device 301) into the processed light communications data 402 in accordance with a protocol. For example, the light communications data 401 might be processed in compliance with Li-Fi protocols and/or Wi-Fi protocols to determine the processed light communications data 402.

The processed light communications data 402 is shown comprising an example string that itself comprises a location identifier 403*a* and a rolling code 403*b*. These portions of the string are illustrative, and merely intended to show how a string might include both location-related information and key-related information. The location identifier 403*a* comprises information about the light source and/or the physical environment 307 (e.g., "store001 reg3_," suggesting that the light source is at a particular store and a particular register). The rolling code 403*b* might be part of a key that is changed periodically (e.g., a key that changes every few seconds, every minute, every hour, or the like). In this manner, the processed light communications data 402 might be usable to identify a particular location of the light source 305 as well as a key that is usable to verify that the mobile device 301 was within view of the light source 305 during a particular period of time.

The request for content 404 illustrates how the processed light communications data 402 might be used as part of requesting content from, e.g., the remote server 304. The request for content 404 is illustratively shown as comprising candidate user authentication credentials, such as a username and a hash of a password. The request for content 404 is further shown as indicating a location—that is, a location that generally corresponds to the location identifier 403*a* of the processed light communications data 402. The request for content 404 is further shown as comprising a key from the processed light communications data 402. That key might be usable only for a period of time (e.g., only within the time period it remains valid before the light source 305 transmits a new key), so the request for content 404 might additionally and/or alternatively comprise an indication of a time corresponding to the key.

The remote server 304 might provide access to content in response to the request for content 404 under certain conditions. For example, access to content may be provided based on the username and/or password hash of the request for content 404 corresponding to a stored username and/or password hash. As another example, access to content may be provided based on an indication of location in the request for content 404 corresponding to one or more predetermined locations (e.g., locations where a user is permitted to access the content). As another example, access to content may be provided based on the key being validated by the remote server 304. To validate that key, the remote server 304 may execute one or more algorithms to determine a key transmitted by the light source 305 at a particular time (e.g., the time indicated in the request for content 404) and compare that determined key to the key received in the request for content 404.

The time-limited nature of the key, in conjunction with the requirement that the key be transmitted via light communications data in a particular physical environment, may significantly improve security over other methods of one-time-use keys. The elements depicted in FIG. 4 show how light data specific to a physical environment might be ultimately translated into a limited-duration key that may be ultimately be used to authenticate a device and entitle the device to content. As such, unlike other one-time-use keys (e.g., those in key fobs or on smartphone applications), the key is only provided while a recipient is in a specific location (that is, within view of a light source emitting the key). This limitation not only ensures that the recipient is in a particular location at a particular time, but makes reverse engineering of the key generation process harder. For instance, even if a malicious user could slowly but surely reverse engineer the algorithm used to generate the key, they might need to do so by receiving the light from the light source. In this manner, so long as the light source is in a reasonably secure physical environment, it might be somewhat easier to detect the malicious party and prevent them from continually capturing and analyzing the key.

Figure 5:
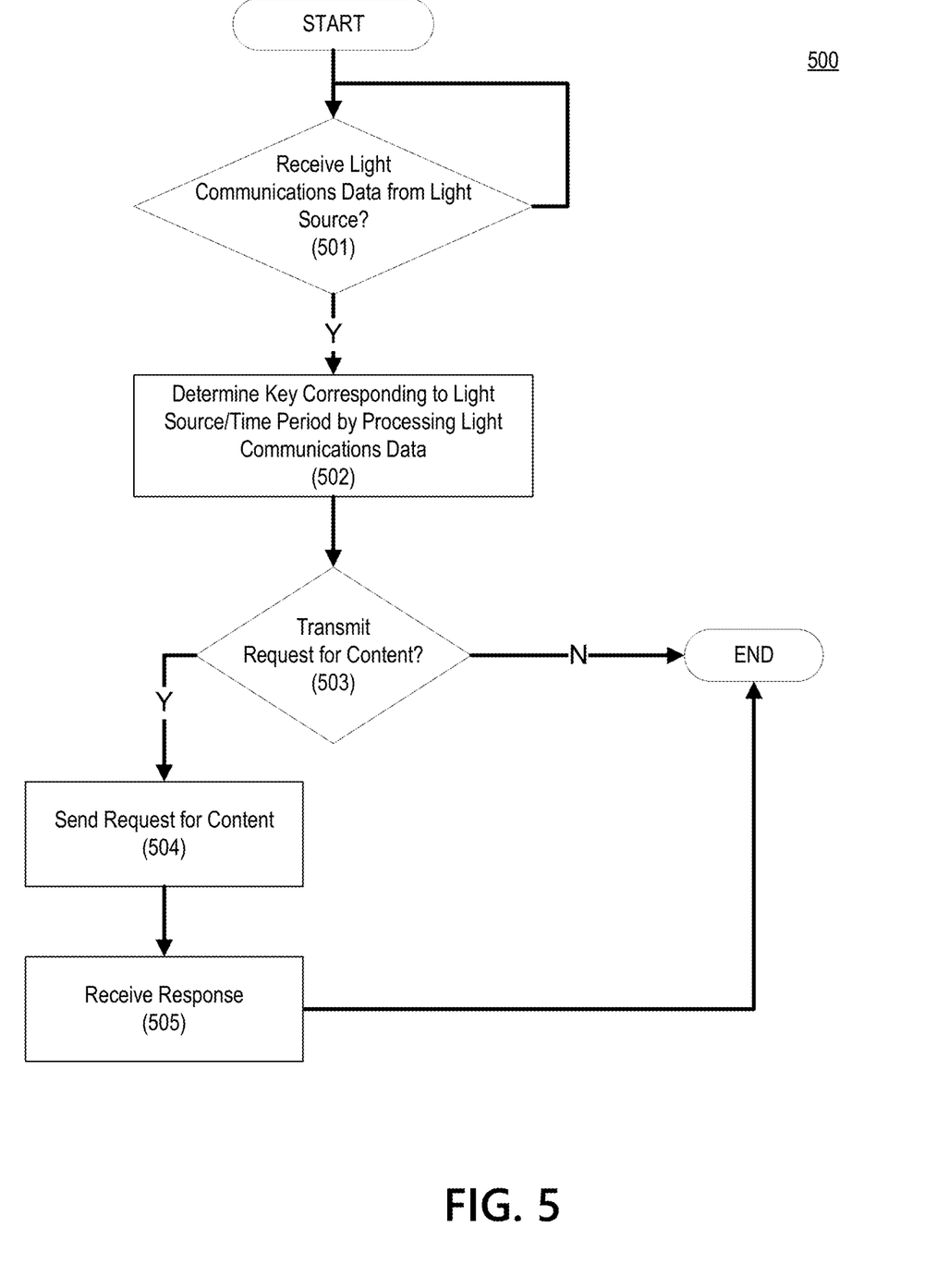
FIG. 5 depicts a flow chart comprising steps which may be performed for using light communications data as part of improving computer authentication.

FIG. 5 illustrates an example method 500 for authenticating a computing device using light communications data in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The method 500 may be implemented by one or more non-transitory computer-readable media that stores instructions that, when executed, cause performance of all or portions of the method 500. The steps shown in the method 500 are illustrative, and may be re-arranged or otherwise modified as desired.

In step 501, a computing device may determine whether it has received light communications data from a light source. A light source (e.g., the light source 305) may be configured to transmit data via light in accordance with a wireless transmission protocol, and the computing device may receive that data by receiving the light via a light-sensitive device. For example, the computing device may receive, via the light-sensitive device 302 (e.g., a Li-Fi receiver communicatively coupled to the computing device) and from the light source 305 (e.g., a Li-Fi transmitter) in the physical environment 307 of the computing device, light communications data that indicates a variation in a modulation of light intensity of the light source over a time period. If the light communications data has been received, the method 500 proceeds to step 502. Otherwise, the method 500 loops and checks (e.g., periodically, such as every few seconds) whether light communications data has been received.

Receiving the light communications data might be performed using a Li-Fi receiver. Various Li-Fi receivers are available (e.g., in USB dongle form), such that the computing device may be configured to receive data directly from the Li-Fi receivers and via, for example, a USB port or similar communications interface. In such a circumstance, such as where the light-sensitive device 302 is a Li-Fi receiver dongle or similar device, receipt of the light communications data might comprise receiving, via a communications interface of the computing device, data, from the Li-Fi receiver dongle, data corresponding to light received by the Li-Fi receiver dongle.

Receiving the light communications data might be performed using one or more cameras of the computing device. One or more conventional computer cameras (e.g., a smartphone camera, webcam, or the like) may be used to receive light communications data in a manner similar to how a Li-Fi receiver might receive that data. With that said, such a process may be relatively more complicated than using a Li-Fi receiver, as receipt of light data using one or more cameras might entail careful control of how video is captured by the one or more cameras. Particularly, the rate of transmission of data via light might be limited by the framerate of the one or more cameras, as detection of changes to light might be limited by the ability of the one or more cameras to detect such changes. Moreover, to ensure fidelity, aspects of the recorded video (e.g., an aperture of the lens, an exposure of a sensor) might be carefully controlled so as to capture the light communications data.

In the circumstance where receipt of the light communications data is performed using one or more cameras, the computing device may receive the light communications data using video recording. For example, the computing device may cause the one or more cameras to record video at a predetermined framerate and determine the light communications data by processing the video. As indicated previously, recording parameters for the video may be established so as to improve the ability of the computing device to receive data transmitted by a light source. For example, the framerate and exposure of the one or more cameras may be selected so as to improve the ability of the computing device to detect data transmitted from the light source.

The framerate with which video is captured by the one or more cameras may be based on the location of the computing device. Different light sources might transmit data at different rates and in different ways, such that different framerates might be required to record and capture data from different light sources. In turn, the one or more cameras may be configured to record at a framerate that corresponds to a nearby resource. For example, the computing device may determine, using a GPS module of the computing device, GPS coordinates corresponding to the computing device, and then determine, based on the GPS coordinates, a predetermined framerate. To effectuate this functionality, the computing device may determine, based on the GPS coordinates, a framerate corresponding to the GPS coordinates. Such information might be stored remotely, such as at the remote server 304.

In step 502, the computing device may determine a key corresponding to a light source and/or time period by processing the light communications data received in step 501. For example, the computing device may determine a key corresponding to the light source 305 and the time period by processing the light communications data. Determining the key may comprise processing the light communications data to identify, within the light communications data, a key. For example, the light communications data might comprise a wide variety of data elements (e.g., time information, error correction codes, protocol details, the key), and determining the key may comprise retrieving the key from among those data elements.

The key might have been determined using a key derivation function (KDF). For instance, the light source 305 may transmit data (e.g., arbitrary strings) that, when input into a KDF along with GPS coordinates, produces a key. Such a KDF might be executed by the computing device as part of step 502, such that determining the key might entail determining GPS coordinates and data from the light communications data and providing them as input to a KDF. This might advantageously ensure that the key reflects both information from the light source 305 as well as GPS coordinates, which may provide additional layers of security and validation of the location of the computing device. Such a KDF might additionally and/or alternatively be executed by the light source 305 and/or a remote server, such as the remote server 304. In this manner, the KDF might be used by the light source 305 and/or the remote server to generate a key which may be transmitted by the light source 305 and via the light communications data.

As part of determining the key, the computing device may process the modulation of the light intensity of the light source 305 over the time period to determine the key. As a very simple example to illustrate this principle, the light source 305 may transmit binary data by modulating a light intensity of light between 440 lumens (corresponding to "0") and 450 lumens (corresponding to "1"). Over time, and using appropriate transmission protocols, the light source 305 may transmit data by switching between 440 lumens and 450 lumens, even though this switch might not be easily perceived by a human being (especially when performed rapidly). As these modulations of light intensity are captured (e.g., by a light-sensitive device), they may be translated into binary data, which might ultimately be processed in accordance with one or more protocols to determine the key.

To provide a simplified example of how determining the key may be performed using one or more cameras (instead of, for example, a Li-Fi receiver), assume that the light source 305 transmits binary data by modulating a light intensity of light between 440 lumens (corresponding to "0") and 450 lumens (corresponding to "1"). This modulation might be performed sixty times every second, such that sixty bits might be transmitted per second. To capture this data as part of step 501, the framerate of the one or more cameras might be set to sixty frames per second such that the one or more cameras might capture, with every frame, whether the light is 440 lumens (that is, "0") or 450 lumens (that is, "1"). The particular speed of the modulation of light and the framerate might be modified to improve the accuracy of data capture by the mobile device. For example, the modulation of light might be limited to thirty bits per second so as to account for the possibility that the one or more cameras of the computing device may be limited to recording thirty frames per second video. In any event, once the binary data is determined based on the video, the key may be determined based on the binary data.

To increase the fidelity of data transmitted by the light source and received by the computing device, and to ensure the key is not malformed when received by the computing device, one or more error correction algorithms may be implemented. For example, in certain circumstances, forward error correction technologies may be implemented to improve the fidelity of transmissions from the light source to the computing device.

The key may be any data element transmitted by the light source. For example, a key might be a string (e.g., a hashed cryptographic string) that is transmitted by the light source. Additionally and/or alternatively, the key might comprise a file (e.g., an encrypted archive file) that is transmitted by the light source. It may be desirable for the key to be hashed and/or encrypted so as to prevent inspection and/or modification by the computing device. For example, rather than the key being an easily edited string (e.g., "Register 0001 11:05 AM GMT"), the string may be salted and hashed such that the resulting string (e.g., "5525adaf4ff520c14ba337aea431b2f3") can be verified by the remote server 304 but cannot readily be edited by a user of the computing device.

In step 503, the computing device may determine whether to transmit a request for content. The computing device may transmit a request for content based on input from a user. For example, a user might, using a user interface, request content and provide, as authentication credentials for accessing that content, user authentication credentials such as a username and password. As another example, a user's computing device may automatically request content based on receipt of light transmission data, such that the computing device may automatically transmit the key along with a request for content if the computing device receives the key via light transmissions. If the computing device decides to transmit the request for content, the method 500 proceeds to step 504. Otherwise, the method 500 ends.

Determining whether to request content may be based on output from a trained machine learning model. A machine learning model, such as might be implemented via the deep neural network architecture 200, may be trained using training data. That training data may comprise information about the location of a computing device and whether content should be requested. For example, the training data may correlate locations and whether content should be requested, such that the trained machine learning model may thereby learn to output whether content should be requested based on a location of a computing device. The trained machine learning model may be provided, as input, an indication of a location of a computing device. For example, the trained machine learning model may be provided the key and/or GPS coordinates corresponding to a location of a mobile device. The trained machine learning model may be trained to provide, as output responsive to the input, an indication as to whether content should be provided. In this manner, GPS coordinates and/or key information may be used to intelligently determine whether certain content (e.g., a certain user interface for banking) should be opened for the user. For example, in this manner, a user's mobile device might, using the trained machine learning model, request a banking user interface when the user is near a teller window, but not when the user is sitting in a seating area in a bank.

In step 504, the computing device may send a request for content. For example, the computing device may transmit, to the remote server 304, a request for content (e.g., the request for content 404). The request for content may comprise a key, such as the key determined in step 502.

The request for content may be transmitted via a communications method different than light communication. For example, as part of sending the request for content, the computing device may transmit, via a wireless network protocol (e.g., Wi-Fi, Bluetooth, etc.) different from Li-Fi, the request for the content. In this manner, while the key might be received via Li-Fi or a similar light transmission mechanism, the request for content need not be sent using the same transmission protocol. This is particularly the case where, for example, the one or more cameras of the computing device might be used to receive the light communications data, as the one or more cameras might be configured to receive the light communications data but not transmit second light communications data responsive to such receipt.

The request for content may comprise user authentication credentials. Before sending the request for content, the computing device may receive, via a user interface, user authentication credentials. In turn, the user authentication credentials may be used to authenticate the computing device along with the key.

The request for content may comprise GPS coordinates. To aid in security, it may be advantageous to transmit the key along with GPS coordinates that indicate a location of the computing device. In this manner, if the two data elements contradict (e.g., the key corresponds to a different geographic location as compared to the GPS coordinates), authentication may be denied by the remote server 304, and the computing device may be prevented from receiving the requested content. In contrast, if the two data elements are approximately the same (e.g., the key corresponds to roughly the same geographic location as compared to the GPS coordinates), authentication may be granted by the remote server 304.

In step 505, the computing device may receive a response to the request for content transmitted in step 504. The response may indicate whether the computing device has been authenticated. Along those lines, if the computing device has been successfully authenticated (e.g., based on the key), the response may comprise all or portions of the content. For example, the computing device may receive, from the remote server 304 and based a determination that the key is associated with the physical environment, access to the content.

A server may determine to authenticate a device, such as the computing device, using a trained machine learning model. A machine learning model, such as might be implemented via the deep neural network architecture 200, may be trained using training data. That training data may comprise information regarding previous authentication requests (e.g., previous requests for content) and whether those previous authentication requests were granted. For example, the training data might comprise an indication, for each previous authentication request, what authentication data was provided (e.g., usernames, passwords, keys from light sources), and whether authentication data was granted. The trained machine learning model may be thereby trained to determine, based on input data comprising authentication credentials and/or keys from light sources, whether to grant authentication. The trained machine learning output might thereby be trained to output an indication of whether authentication should be granted. Such a trained machine learning model might be helpful where, for example, a wide variety of authentication data and/or keys are received. The trained machine learning model may be further trained based on whether authentication is granted (e.g., access to content is provided) in step 505. In other words, the trained machine learning model may be continually trained to better determine whether authentication should be granted based on whether a particular device was, in fact, authenticated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device comprising:
one or more processors; and
memory storing instructions that, when executed by the one or more processors, cause the mobile device to:
receive, via a light-sensitive device and from a light source in a physical environment of the mobile device, light communications data that indicates a variation in a modulation of light intensity of the light source over a time period by:
determining, using a Global Positioning System (GPS) module of the mobile device, GPS coordinates corresponding to the mobile device;
determining, based on the GPS coordinates, a predetermined framerate;
causing one or more cameras to record video at the predetermined framerate; and
determining the light communications data by processing the video, wherein the light source is configured to transmit different keys on a periodic basis;
determine a key corresponding to the light source and the time period by processing the light communications data;
transmit, to a remote server, a request for content, wherein the request for content comprises the key; and
receive, from the remote server and based a determination that the key is associated with the physical environment, access to the content.

2. The mobile device of claim 1, wherein the light-sensitive device comprises a Li-Fi receiver communicatively coupled to the mobile device, and wherein the light source comprises a Li-Fi transmitter.

3. The mobile device of claim 1, wherein the variation in the modulation of the light intensity of the light source over the time period comprises a modulation of ultraviolet light emitted by the light source over the time period.

4. The mobile device of claim 1, wherein the instructions, when executed by the one or more processors, cause the mobile device to process the light communications data by causing the mobile device to:
process the modulation of the light intensity of the light source over the time period to determine the key.

5. The mobile device of claim 1, wherein the light source is configured to transmit data via light in accordance with a wireless transmission protocol.

6. The mobile device of claim 1, wherein the instructions, when executed by the one or more processors, cause the mobile device to:
receive, via a user interface, user authentication credentials, wherein the request for the content comprises the user authentication credentials.

7. The mobile device of claim 1, wherein the light source comprises a light bulb.

8. The mobile device of claim 1, wherein the instructions, when executed by the one or more processors, cause the mobile device to transmit the request for the content by causing the mobile device to:
transmit, via a wireless network protocol different from Li-Fi, the request for the content.

9. The mobile device of claim 1, wherein the light communications data further indicates a variation in color of the light source over the time period.

10. A method comprising:
receiving, by a mobile device, via a light-sensitive device, and from a light source in a physical environment of the mobile device, light communications data that indicates a variation in color of the light source over a time period by:
determining, using a Global Positioning System (GPS) module of the mobile device, GPS coordinates corresponding to the mobile device;
determining, based on the GPS coordinates, a predetermined framerate;
causing one or more cameras to record video at the predetermined framerate; and
determining the light communications data by processing the video, wherein the light source is configured to transmit different keys on a periodic basis;
determining a key corresponding to the light source and the time period by processing the light communications data;
transmitting, to a remote server, a request for content, wherein the request for content comprises the key; and
receiving, from the remote server and based a determination that the key is associated with the physical environment, access to the content.

11. The method of claim 10, wherein the light-sensitive device comprises a Li-Fi receiver communicatively coupled to the mobile device, and wherein the light source comprises a Li-Fi transmitter.

12. The method of claim 10, wherein the variation in the color of the light source over the time period comprises switching between two colors over the time period, wherein each of the two colors represents a binary value.

13. The method of claim 10, wherein processing the light communications data comprises:
processing the variation in color of the light source over the time period to determine the key.

14. The method of claim 10, wherein the light source is configured to transmit data via light in accordance with a wireless transmission protocol.

15. One or more non-transitory computer-readable media storing instructions that, when executed by one or more processors of a mobile device, cause the mobile device to:
receive, via a Li-Fi receiver and from a Li-Fi transmitter in a physical environment of the mobile device, light communications data that indicates a variation in a modulation of light intensity of the Li-Fi transmitter over a time period by:
determining, using a Global Positioning System (GPS) module of the mobile device, GPS coordinates corresponding to the mobile device;
determining, based on the GPS coordinates, a predetermined framerate;
causing one or more cameras to record video at the predetermined framerate; and
determining the light communications data by processing the video, wherein the Li-Fi transmitter is configured to transmit different keys on a periodic basis;
determine a key corresponding to the Li-Fi transmitter and the time period by processing the light communications data;
transmit, to a remote server, a request for content, wherein the request for content comprises the key; and
receive, from the remote server and based a determination that the key is associated with the physical environment, access to the content.

16. The one or more non-transitory computer-readable media of claim 15, wherein the light communications data further indicates a variation in color of the Li-Fi transmitter over the time period.

17. The one or more non-transitory computer-readable media of claim 15, wherein the variation in the modulation of the light intensity of the Li-Fi transmitter over the time period comprises a modulation of ultraviolet light emitted by the Li-Fi transmitter over the time period.

18. The one or more non-transitory computer-readable media of claim 15, wherein the instructions, when executed by the one or more processors, cause the mobile device to process the light communications data by causing the mobile device to:
process the modulation of the light intensity of the Li-Fi transmitter over the time period to determine the key.

* * * * *